(12) United States Patent
Das Adhikary

(10) Patent No.: US 10,094,667 B2
(45) Date of Patent: Oct. 9, 2018

(54) AUTONOMOUS PRECISION NAVIGATION

(71) Applicant: Amiya Das Adhikary, Baripada (IN)

(72) Inventor: Amiya Das Adhikary, Baripada (IN)

( * ) Notice: Subject to any disclaimer, the term of this patent is extended or adjusted under 35 U.S.C. 154(b) by 404 days.

(21) Appl. No.: 14/378,346

(22) PCT Filed: Mar. 4, 2013

(86) PCT No.: PCT/IN2013/000121
§ 371 (c)(1),
(2) Date: Aug. 13, 2014

(87) PCT Pub. No.: WO2013/132517
PCT Pub. Date: Sep. 12, 2013

(65) Prior Publication Data
US 2015/0066240 A1    Mar. 5, 2015

(30) Foreign Application Priority Data
Mar. 7, 2012    (IN) .............................. 239/KOL/2012

(51) Int. Cl.
| G01C 21/12 | (2006.01) |
| G01C 23/00 | (2006.01) |
| G01S 13/91 | (2006.01) |
| G08G 5/02  | (2006.01) |
| G08G 5/00  | (2006.01) |

(52) U.S. Cl.
CPC ............ *G01C 21/12* (2013.01); *G01C 23/00* (2013.01); *G01S 13/913* (2013.01); *G08G 5/0021* (2013.01); *G08G 5/0052* (2013.01); *G08G 5/025* (2013.01)

(58) Field of Classification Search
None
See application file for complete search history.

(56) References Cited

U.S. PATENT DOCUMENTS

2012/0095621 A1*    4/2012    Zhu .................... G05D 1/101
                                                                701/3

* cited by examiner

*Primary Examiner* — Mussa A Shaawat
*Assistant Examiner* — Kyung J Kim

(57) ABSTRACT

The new invention is a method for a self-contained multi-functional navigation device. It computes 3D-Spatial velocity of the vehicle and of fluid medium surrounding the vehicle, using a movement sensor system comprising low power Transmitter and plurality of Receivers placed close to the Transmitter. The said computation measures propagation time delay of low frequency pulse envelope modulating carrier EM (radio) waves using Time to Digital Converter (TDC). Orientation, direction, position and movement data are derived using well known mathematical formulae. Derived movement data are displayed graphically on a Visual Display Screen. A commercial computer comprising real time operating system, stored digitalized Navigation data and digitalized map facilitates data computation and control and guidance. The method and movement sensor device can be used in any type of vehicle (airborne, surface, sub-surface, marine, sub-marine or space) as a means for navigation and control guidance aid.

18 Claims, 9 Drawing Sheets

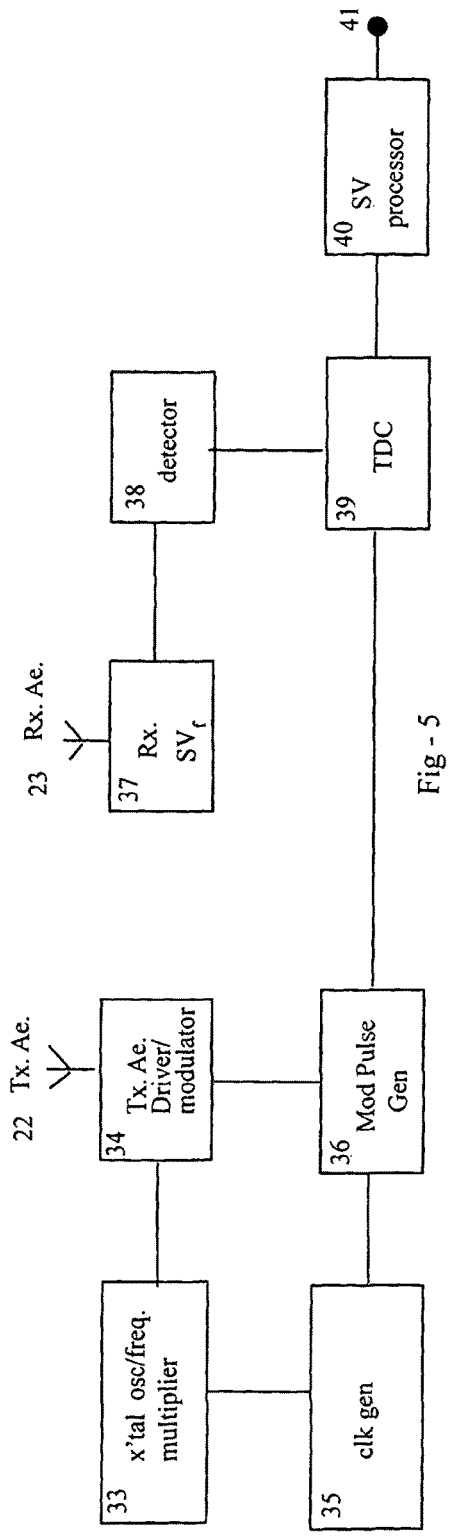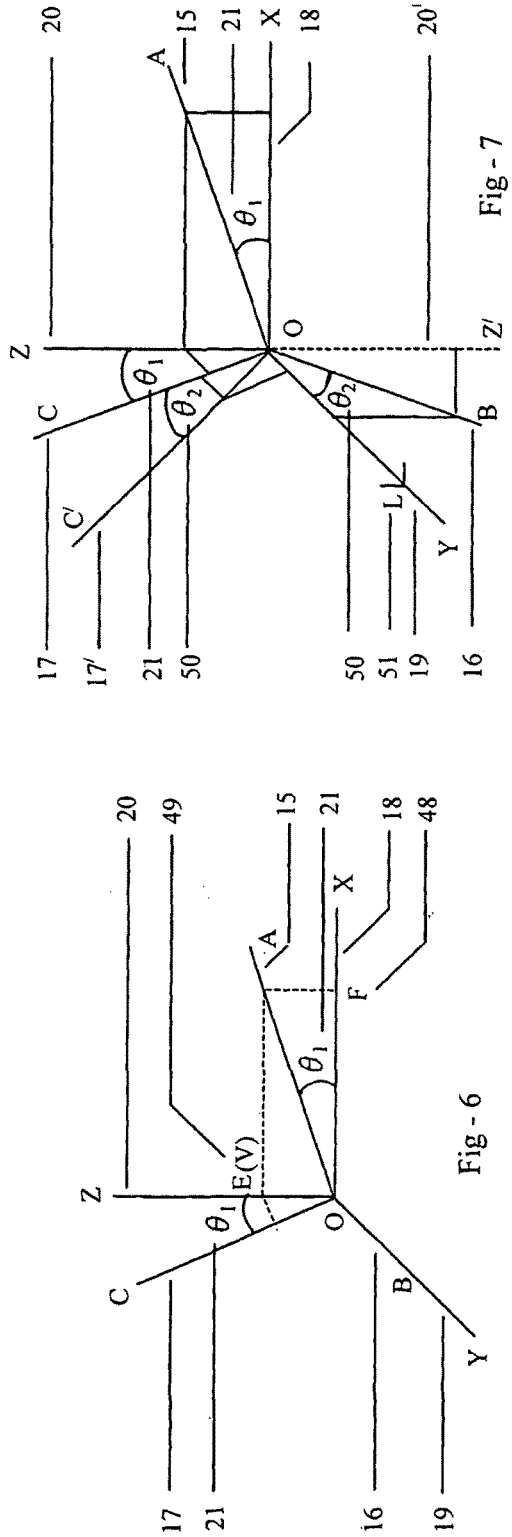

AUTONOMOUS PRECISION NAVIGATION

FIELD OF INVENTION

This invention relates to a method and an on board self-contained multifunctional system for Navigation and Control of any type of vehicle (airborne, surface, sub-surface, marine, sub-marine or space) on which the system of this invention is mounted. In particular it relates to measuring spatial velocity along body fixed axes of the vehicle on which the system is mounted by measuring propagation time delay for a predetermined time frame pulse that modulates carrier wave & travels through space from a generating source (Transmitter) to multiple receivers each of which is placed on one of the principal axes (longitudinal, lateral and vertical) of the subject vehicle. Movement and orientation data with respect to geophysical plane are derived using the said spatial velocity and well known mathematical formulae. The instantaneous position, course and altitude are derived by dead reckoning (DR) from an initial setting. For vehicles moving through fluid (air and/or water), additional receivers placed at an offset angle to receivers placed along longitudinal, lateral and vertical axes of the subject vehicle facilitates computation of dynamic data of fluid (air and/or water) in the vicinity of the subject vehicle moving in the said medium(s) and effect of movement of the said medium(s) on the movement of said vehicle. Using a commercial computer and stored digitalized map and digitalized navigation data and display unit a multifunctional aid for Navigation and Control of the said subject vehicle is provided. The method and system can serve both manned and unmanned vehicles.

BACKGROUND OF THE INVENTION

Navigation aids are meant to determine speed, direction, orientation, position of a vehicle and these data are used to control and guide the vehicle for safe passage from start to destination. For vehicles moving in fluid medium(s) [air and/or water], the relative speed and direction of the medium in the proximity of the vehicle and effect of movement of medium on the vehicle are also needed to be determined.

For these functions, multiple aids were being used. But rise in traffic density, increase in speed, widening of area of operation, emphasis on economic and fast efficient transit have shifted the focus to new types of Navigation aids which are multifunctional, more accurate and reliable.

At present, such aids can be put under two categories. Satellite based Navigation System GNSS (Global Navigation Satellite System) and INS (Inertial Navigation System). In some systems both the systems are combined to overcome the short comings of both.

GNSS comprising of GPS (USA), GLONASS (RUSSIA) satellites along with augmentation systems DGPS, WAAS (USA), EGNOS (Europe), MTSAT (Japan), GAGAN (India), is being groomed to evolve as primary/sole means of Navigation. Precision (accuracy) of satellite based Navigation is way ahead in comparison to other Radio Navigation Aids and is in the range of 3-30 meters for civilian use. It has the global coverage except in extreme polar-regions. But it has not the other basic performance requirements: Continuity, Availability and Integrity up to the expected level as yet. Satellite based Navigation Systems also suffer from errors that can degrade its precision. The errors are—ionospheric, atmospheric, clock, receiver, ephemeris and position dilution of precision. And of course, the satellite constellation owner country can degrade the precision and even suspend availability of service. Possibilities of black out and jamming are other shortcomings of this type of Navigation aids.

INS is the mainstay of space, marine, submarine and Guided Weapon GN&C (Guidance, Navigation and Control). But it plays supplementary role for commercial vehicle Navigation of other types of vehicles. This is due to (i) high cost of equipment, (ii) mechanical parts hampering reliability in the form of wear, gimbals lock and ring lock (laser) and putting restriction on maneuver, (iii) requirement of position correction by input from other type of Navigation Systems during operation period to overcome integration drift.

Both the systems are unable to determine fluid (air and/or water) movement data in the vicinity of the vehicle through which the vehicle moves and effect of said fluid movement on vehicle movement which is a very important determinant for movement of vehicle through fluid (air and/or water).

The shortcomings of Satellite based Navigation Systems and Inertial Navigation Systems are overcome by method and system of this new invention.

OBJECTS OF INVENTION

The primary object of this invention is to provide a self contained onboard multifunctional Navigation and control guidance System to eliminate external influences inducing error and reducing dependence on multiple external aids.

It is another object to provide a Navigation system which fulfils all the four basic performance requirements i.e. a Navigation aid which will provide (i) uninterrupted service during complete operation period (Continuity), (ii) maintain required quality all the time (Availability), (iii) will warn the operator/crew in the event of failure (Integrity) and (iv) provide guidance within predefined (such as conformity to Required Navigation Performance (RNP) for air navigation) tolerance (Precision).

An important object is to compute spatial velocity of the vehicle along body-fixed axes (longitudinal, lateral and vertical) of millimeter (sub-centimeter) accuracy.

Another object is to determine speed, direction, orientation of the vehicle with respect to surface of the earth and for vehicles moving through fluid medium speed of the vehicle relative to fluid medium.

An important object is to provide displacement magnitude, rate of displacement and instantaneous geo-physical position of the vehicle with provision for reliable means for self-correction for drift integration error.

Another object is to compute relative or absolute speed and direction of the fluid medium (air and/or water) movement in the vicinity of the vehicle through which the vehicle is moving and effect of fluid medium movement on the vehicle electronically without pressure operated instruments and without any part or portion of the system placed on the external skin of the vehicle.

Another object is to provide these basic data and data derived from these basic data to aid safe, efficient, economic operation of all types of vehicles (air, surface, marine, submarine and space) and providing guidance and control to the vehicle from start to destination.

SUMMARY OF THE INVENTION

Autonomous Functional Aspects:

By Autonomous Functions is meant the functions the system of present invention can perform in complete isolation from any instrument or system whether located onboard or outside of the user vehicle.

For user vehicles of all categories the common autonomous functional aspects are as follows:

i) One aspect of this invention is the system of this invention has a self-contained sensor for sensing spatial velocity of the subject vehicle along its longitudinal, lateral and vertical axes.

ii) Another aspect is determination of momentary position as well as orientation (yaw, roll, pitch angles) with respect to earth's surface and movement data of the mount vehicle under all operating condition and anywhere around the globe continuously in complete isolation from any instrument or system external to the system of invention, using the self-contained sensor output.

iii) Another aspect is, the sensor can compute relative movement data of fluid (air and/or water) in the proximity of the user vehicle moving through the said fluid and compute the effect of the said fluid movement on the vehicle movement continuously.

iv) The system can measure any range of velocity in either direction (forward or reverse) along each of the spatial axis.

In respect of the preferred embodiment for use in air vehicles and discussed in this disclosure, the autonomous functional aspects are as follows:

i) The system in its embodiment for use in air vehicles can substitute all the following conventional primary flight instruments or PFD's (in recent use) of air vehicles i.e. Altimeter, Airspeed Indicator, Attitude Indicator (Artificial Horizon), Magnetic Compass, Heading Indicator/Horizontal Situation Indicator, Turn Indicator, Vertical Speed Indicator and additional Panel instruments i.e. Course Deviation Indicator, Radio Magnetic Indicator and graphically display the relevant information provided by the said panel instruments on a single visual display unit numerically and/or non-numerically.

ii) Both course on ground (track) and mount vehicle heading (along its longitudinal axis) will be provided simultaneously and for both, heading indications with respect to magnetic and true north will be graphically displayed as numerical reading in degrees.

iii) In addition the information regarding vital speeds will be indicated alongside TAS (True Airspeed) graphical display. Wind direction and speed, wind vector components, angle of attack and drift rate will also be displayed.

iv) Another aspect of the present invention is it will provide instantaneous position of the mount vehicle by displaying position of the subject vehicle on moving map display as well as in Coordinates (Longitude/latitude) based on WGS-84 datum reference in a separate window. The position information is also displayed in respect of relevant way points on the said display unit.

v) Another aspect of this invention is to provide Navigation and Control Guidance by providing a path (to be followed as predefined) overlay on the said map display and can generate offset path overlay too.

vi) One more aspect is that, the system will sense initiation of drift instantaneously and help initiation of immediate corrective action in real time so that drift is kept to minimum or negligible. Further, the system can measure distance deviated from track and course correction required to resume the track instantaneously. To facilitate control movement for track alignment a group of information is displayed. The group information comprises ground speed, ground heading (track), off track distance, track angle error, set course to, turn anticipation (with turn radius calculation and determination of position of origin of turn radius), indication for commencement and discontinuance of turn and climb/descent instructions and a non-numeric graphic display with an icon as aim figure for track alignment will make it easier for the crew to maintain track.

vii) The system of the present invention will generate a new path overlay on map as and when deviation from predefined primary path is imminent and an alternate destination point is selected due to any emergency or any other reason or due to selection of an offset track.

viii) An important aspect is that the system of present invention can generate a flight plan and edit the same during flight without affecting normal operation.

ix) The system will compute distance and bearing to any way point from aircraft position or from any other way point and display the same.

x) The system will compute slant range and bearing to any way point and display the same.

xi) The system enhances the easiness of controllability of the subject vehicle by providing displayed direction for speed adjustment required, altitude (climb/descend to), turn (to heading) directions and can feed. Automatic Flight Control System (auto pilot) with data required for controlling the vehicle.

xii) The present invention will provide Navigation and control guidance for VFR/IFR flight rules as required.

xiii) Another important aspect of the present invention is to provide Approach and Landing Guidance of Approach Category I, II, III and virtual ground controlled approach (audio guided) of Precision Approach Radar (PAR) type to aircraft for the runways around the world for which longitude, latitude (coordinates based on WGS-84 datum) Information is available.

xiv) The system of this invention can cater for any shift in runway touchdown point and change in runway usable length.

xv) The system of this invention will also provide Navigation and Control guidance on the ground during taxi out and taxi in phases of movement.

xvi) The system of present invention is not dependent on any barometric or inertial navigation instrument or earth referenced navigation instrument.

xvii) The system also provides the $4^{th}$ Dimensional i.e. solutions to Time related problems.

xviii) The system will comprise of a commercial computer encompassing Real Time Operating System (RTOS) for real time computation and derivation of related data.

xix) The system will consist of a storage memory in which digitalized maps, charts, navigation data, geo-physical data check lists and procedures will be stored.

xx) Provision of backup power supply unit will enable the system of this invention to provide all the services of autonomous function enumerated above even in the event of power supply failure from main source of supply. Thus the subject vehicle will continue to have service of the system and reach a destination safely.

Integrated Functional Aspects:

The system of invention, when integrated with equipments on board the subject vehicle, can perform the following functions too.

i) Integrated with Automatic Flight Control System (AFCS) commonly known as auto pilot, the system of this invention can have dynamic control over pitch, roll and yaw and thrust commands. Since the controlling inputs are electronically generated the problem of violent response as happens in the event of vacuum operated instrument failure is avoided.

ii) Integrated with digitalized data transmission/reception of Air Traffic Network (ATN) or suitable communication means, the system of present invention will enhance the Automatic Dependent Surveillance (ADS) capability of Ground Controlling Agencies by providing position and other required data as laid down by ICAO for required surveillance performance (RSP) continuously.

iii) Digitalised data transfer between aircraft directly (ADS-B) or through ground establishment, will provide full proof collision avoidance on ground or in the air because of (i) high measurement accuracy in millimeters (linear displacement) and seconds (angular displacement) per second (time) computed in real time, (ii) computation of collision probability and point of prospective collision (resolved 3-dimensionally) which will enable the crew to take procedural avoidance method well in time to prevent collision. Display of surrounding traffic on moving map display (CDTI) will enhance traffic situational awareness of the crew.

EMBODIMENTS

The system of new invention can be used in any type of vehicle (air, surface, marine, sub-marine or space). The sensor sub-system operation being same only computed Navigation Aid data and Control data will vary to cater for user specific requirement. Hence the embodiments for use in different types of vehicles will substantially be same.

The Preferred Embodiment

The acronym for Autonomous Precision Navigation is 'APNA' which, in Indian. National Language (Hindi) means 'my own'. The method of this invention provides an onboard system which is truly 'my own' Navigation Aid for the mount vehicles. To understand the principle and application of the invention, embodiment for use in aircraft which the inventor calls ABLAN (Airborne Landing and Navigation) System will be explained. This embodiment is illustrated in the drawings and specific language will be used to describe the same.

Nevertheless, may it be understood that the scope of the invention is equally applicable to other classes of vehicles (surface, sub-surface, marine, submarine or space) too for solving navigation, control and safety related problems of those classes of vehicles as it would normally occur to a person skilled in the art to which the invention relates.

BRIEF DESCRIPTION OF THE DRAWINGS

FIG. 3 C Shows the combination of body fixed axes of FIG. 3 (a), and dynamic Geophysical axes of 3 B.
FIG. 4 B Shows additional movement sensor Antennae for computation of wind direction, speed and component vectors.
FIG. 5 Shows hardware architecture for movement sensor data computation.
FIG. 6 Shows transformation of spatial movement data (forward) to Geophysical movement data (forward and vertical) under without bank condition.
FIG. 7 Shows the same transformation of FIG. 6 under bank condition and determination of pitch angle and bank angle.
FIG. 8 B Shows method for calculation of speed along vertical (OZ) axis.
FIG. 8 C Shows method for calculation of speed along lateral (OY) axis.
FIG. 8 D Shows method for calculation of yaw Angle and ground speed.
FIG. 9 B Shows method for calculation of turn anticipation and radius (fly over).
FIG. 13 B Shows method for, computing visual display for VNAV during approach.
FIG. 14 B Shows method for computing audio guidance for VNAV during approach.

DETAILED DESCRIPTION OF THE PREFERRED EMBODIMENT

Figure 1:
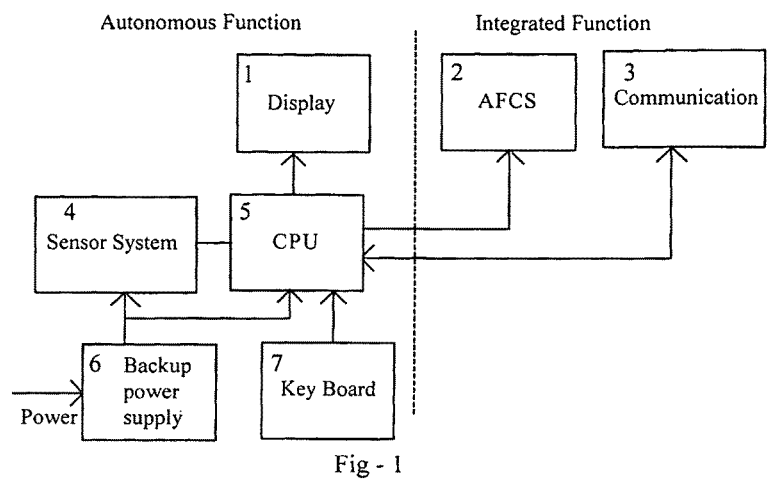
FIG. 1 Shows a hardware architecture of the system.

FIG. 1 depicts the hardware structure of the system of the new invention. It has a sensor sub-system (4) comprising transmitter and receivers for sensing 3-dimensional velocity of the mount vehicle and of fluid (air and/or water) in the vicinity and processor for computing the said data. The outputs of the sensor are fed to the CPU (5) of a commercial computer. The said computer encompasses real time operating system (RTOS) and high level language. It derives the instantaneous movement data and orientation of the mount vehicle using spatial velocity derived by sensor sub-system and instantaneous position information by dead reckoning using derived displacement information. Digitalized map data and navigation data stored in the memory, facilitate control guidance, flight plan generation and compute terrain clearance. The derived information is graphically displayed on a single screen (1). The crew has option to use key-board (7) to use the computer for retrieving stored information/chart/checklist etc. for ready reference and assembling/editing flight plan. Provision of back-up power supply (6) ensures uninterrupted operation of the system even in the event of failure of main power source. The sub-sections of the system discussed so far are meant for stand-alone autonomous function. Integration with Automatic Flight Control System (AFCS) (2) enables the system of present invention to have dynamic control over the subject aircraft. Integration with Communication Network (3) for digitalized data transfer with traffic elements and ground stations for Air Traffic Management (ATM) will enhance Automatic Dependent Surveillance (ADS), traffic flow management capability and ensure full-proof operational safety (ACAS-I &II) on the ground and in the air.

Principle

Figure 2A:
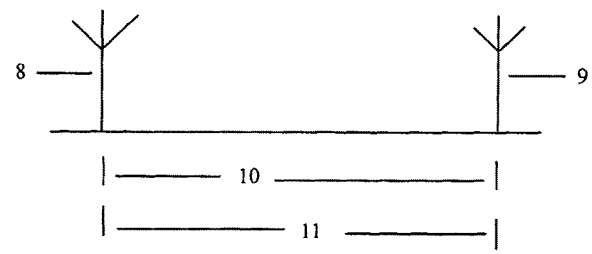
FIG. 2 A Depicts the principle of movement sensor (static condition)
FIG. 2 B Depicts the principle of movement sensor (dynamic condition)
FIG. 3 A Shows the body fixed axes along longitudinal, lateral and vertical directions of the mount vehicle.

As shown in FIG. 2A, EM (radio) wave travelling from a transmitter antenna (8) to a receiver antenna (9), both mounted and fixed on the vehicle and aligned to its principal axes (longitudinal, lateral or vertical) have the constant separating distance ($S_o$) (10) and during movement their spatial velocity in the direction of the principal axes will be same as that of the mount vehicle. EM wave has absolute velocity ($V_{EM}$) and is equal to $3 \times 10^5$ Km/Sec. i.e. $3 \times 10^{10}$ Cm/Sec (The approximate value is taken for explaining the invention. However the actual value of 299999.998 Km/Hr will be used for computation of data in actual system). Every EM wave will take a constant time ($t_o$) (11) to travel through space from Tx. Ae. (8) to Rx. Ae (9) when the vehicle is static.

Figure 2B:
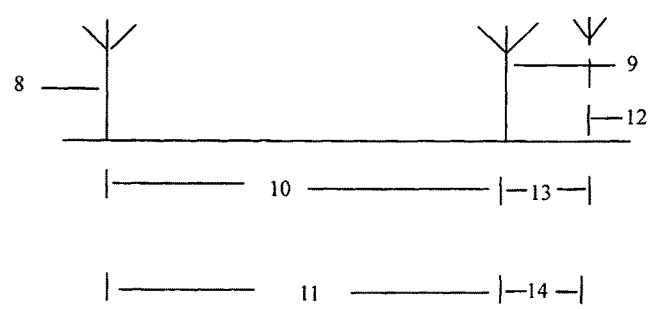

As shown in FIG. 2B, when vehicle moves at spatial velocity of SV Km/Hour in the direction of Rx. Ae. (9), even though distance between Tx, Ae.(8) and Rx.Ae.(9) ($S_0$) (10) remains unchanged, a modulated pulse propagating from Tx. Ae.(8) to Rx. Ae.(9) will have to traverse an additional distance ($\Delta S$) (13) which is equal to the distance travelled by the vehicle in ($t_0$)(11) second. Now, instead of ($t_0$)(11) second the time taken by the pulse modulated by electromagnetic (EM) wave to travel from Tx. Ae.(8) to Rx.Ae. (9) will increase. Let the additional time be ($\Delta t$)(14) second. Similarly, movement of the vehicle in opposite direction will cause reduction of distance by ($\Delta S$) and consequent reduction in propagation time by ($\Delta t$) second. Thus, spatial velocity of the vehicle (SV) is reflected in the propagation time of the pulse.

The fact will give rise to a difference in number of waves (cycles) received during movement as compared to number of waves that would have been received if the mount were in static condition in a certain time frame. Let this difference in no. of cycles in the given time frame be $\Delta f$. $\Delta f$ is a dependent function of Vm. Hence, mount velocity along spatial axes can be computed when $\Delta f$ is determined.

For the purpose of compution, we will relate $\Delta f = 1$ cycle to $V_M = 1$ Km/Hour. (It may be noted that we can adopt whatever conversion ratio is convenient for the mount in consideration and unit of measurement can also be chosen to meet the user's requirement).

Basic Equations

Let, distance between Tx.Ae. and Rx. Ae.=$S_0$ Cm.

Time to traverse ($S_0$) Cm by EM wave transmitted pulse=$t_0$ Sec.

Spatial velocity of vehicle=SV Cm/Sec.

Propagation speed of transmitted pulse=$V_{EM}$ Cm/Sec

Taking spatial velocity (SV) of vehicle along a principal axis as 1 Km/hour.

$$t_o = \frac{S_o}{V_{EM}} = \frac{S_o}{3 \times 10^{10}} \text{Sec.} \quad (1)$$

$$\Delta S = t_0 \times SV \quad (2)$$
$$= \text{Cm} \frac{S_o}{3} \times 10^{-10} \times \frac{10^5}{3600} \text{Cm}$$
$$= \frac{S_0 \times 10^{-7}}{108} \text{Cm}.$$

$$\Delta t = \frac{\Delta S}{V_{EM}} \quad (3)$$
$$= \frac{S_0 \times 10^{-7}}{108 \times 3 \times 10^{10}}$$
$$= \frac{S_0}{324} \times 10^{-17} \text{Sec.}$$

For eqns. (2) and (3), (3a)

$$SV = \frac{\Delta t}{t_0} \times V_{EM} \text{Cm/Sec.}$$

The cumulative delay $\Sigma\Delta t$ to be equal to $1/f$ Sec. so that $\Delta f = 1$ cycle, we are to cumulate time delay for $$\left(\frac{1}{f} \div \Delta t\right) \text{Cycles} = \frac{1}{f \times \Delta t} = \frac{324 \times 10^{17}}{So \times f} \text{Cycles} \quad (5)$$

$\Sigma\Delta t$ for no. of cycles in equation (5) based on $V_M = 1$ km/hr is the required time-frame ($t_c$) where, $$t_c = \frac{324 \times 10^{17}}{So \times f \times f} = \frac{324 \times 10^{17}}{So \times f^2} \text{Sec.} \quad (6)$$

Equation (6) is the duration ($t_c$) for which it is required to count the received cycles to relate $\Delta f$ (cycles):

$$V_{M\left(\frac{Km}{Hour}\right)}:$$

1:1 i.e., Number of cycles directly reads spatial velocity (in Km/Hour) along the axis in consideration.

When measured from time 0 (zero) of time frame ($t_c$), for movement in the direction of the Rx. Ae. or opposite to it in the time frame of equation (6), number of pulses received will be equation (5) $\pm n$ where $n = V_M$ in Km/Hour. The value of (n) is (+) positive for movement in the direction of the receiver antenna and (−) negative for movement in the opposite direction. However, the method requires an absolutely stable carrier frequency because even a single cycle deviation will not be acceptable and as is well known in the art such standard is not possible to achieve. To overcome the difficulty a new approach is introduced in this invention. Frequency stability may not be achievable but a pulse of representative duration ($t_c$) can be made stable. A pulse of duration $$t_c = \frac{324 \times 10^{17}}{So \times f^2} \text{Sec.}$$

will represent the time frame for which the carrier waves be modulated and instead of counting cycles the propagation, delay of the time frame will be measured accurately by time to digital converter (TDC) of the processor of the sensor. The $\Sigma\Delta t$ thus computed when divided by pulse duration of one cycle of the predetermined frequency 'f' based on which $t_c$ is determined, the quotient will directly read velocity in kilometer per hour along longitudinal, lateral or vertical axis of the vehicle. The other movement data like orientation, displacement, rate of displacement, instantaneous position and many more in respect of the vehicle can be derived using thus computed spatial velocity of the vehicle as has been shown in this disclosure.

Spatial 3-D Velocity of Mount

In the preferred embodiment for disclosure of this invention which is to be used in aircraft, the system function is enumerated herein.

Figure 3:
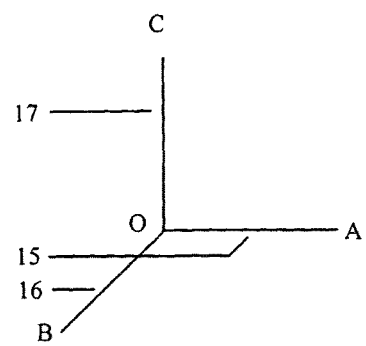
FIG. 3 B Shows the dynamic Geophysical axes in three dimension.
Figure 3:
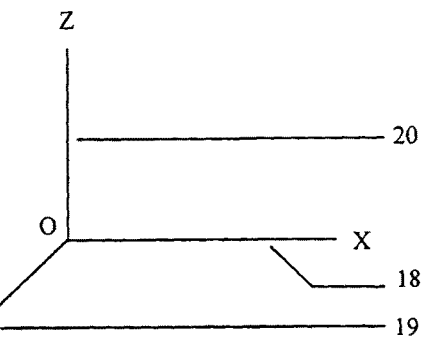
Figure 3:
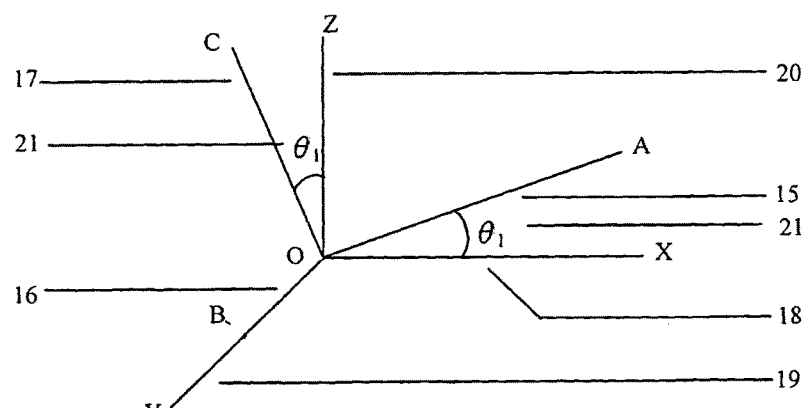

As shown in FIG. 3A aircraft like any other vehicle has three principal body fixed axes, viz. longitudinal ($\overrightarrow{OA}$) (15), lateral ($\overrightarrow{OB}$) (16), and vertical ($\overrightarrow{OC}$) (17), and they are spatial in nature. These axes are different from axes oriented on Geo-physical plane which have dynamic co-ordinates along $\overrightarrow{OX}$, (18) $\overrightarrow{OY}$ (19) on horizontal plane and $\overrightarrow{OZ}$ on vertical plane as shown in FIG. 3B. The word dynamic denotes that the geophysical axes are not fixed to any direction rather they are projection of spatial axes of the vehicle on earth's surface such that X and Y co-ordinates move in alignment with corresponding body fixed axes and Z co-ordinate is orthogonal to the horizontal geo-physical co-ordinates. The origin of these two frames is same as shown in FIG. 3C.

Figure 4:
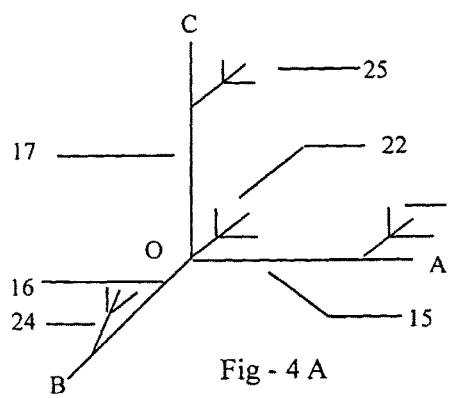
FIG. 4 A Shows primary movement sensor Antennae layout along three spatial axes.
Figure 4:
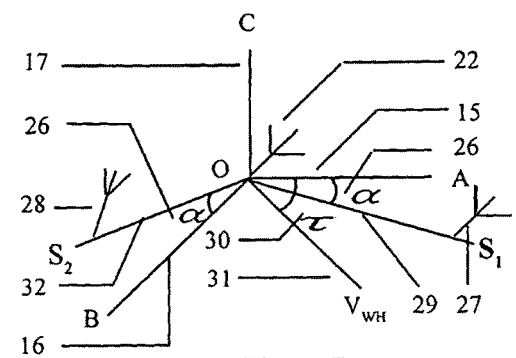

As shown in FIG. 4A an omni-directional Tx. Ae. (22) is placed at the origin and on each of the three principal axes of the vehicle or on lines parallel to principal axes and at an angle 90° to each other a Rx. Ae. (23, 24, 25) is placed at a distance ($S_o$) from the Tx. Ae. (22).

As shown in FIG. 5, a crystal controlled local oscillator (33) feeds the Tx. Ae. (22) through a modulator/driver (34) for a duration of equation (6).

Since all the sensor processing channels are identical, only function of one channel (as shown in FIG. 5) will be explained.

The very low power transmission of EM (radio) wave is received at corresponding Rx. Ae. (23, 24 or 25). Receiver (37) receives the time frame pulse the propagation time delay of which is proportional to spatial velocity of the mount along the axis. The received pulse is amplified (37), detected (38) and compared to the original modulating, pulse. The time difference between trailing edges of the two pulses is measured using Time to Digital Converter (TDC) (39). This is the time delay $\Sigma\Delta t$ which when divided by $1/f$ sec gives mount velocity in kilometers per hour along the axes on which Rx Ae is mounted. Spatial Velocity processor (40) carries out this processing and gives output (41). This output is fed to CPU of computer which carries out mathematical calculations to compute data for aiding navigation and control of the vehicle and generate numeric/non-numeric graphic for display of information on VDU.

Let, the sensor output (spatial velocity SV) be along
Longitudinal axis - - - $SV_f$
Lateral axis - - - $SV_l$
Vertical axis - - - $SV_v$ These outputs of sensor sub-system are spatial velocities of the mount vehicle along respective body fixed axis and gives direct numerical values in Km/Hour.

Clock pulse generated by ck pulse gen (35) synchronises the operation of Tx, Rx and processor and other sub-systems. Modulator pulse generator (36) generates main modulating time frame pulse and test pulse.

It may be noted that for the purpose of computation of spatial velocities in 3-Dimension, the sensors may be a pair of Tx-Rx using radio, laser or any such travelling EM waves. The basic computation principle will stand good. The preferred carrier for this invention is radio wave as the hardware for the system will be cheap and the actual carrier frequency being irrelevant for the purpose of computation of velocity, a suitable allotted navigation aid frequency can be used.

The unit of measurement can be converted to user specific unit e.g. knots and feet per minute which is the case for embodiment for use in aircraft.

Transformation of Spatial Velocity to Velocity Along Geo-Physical (Horizontal & Vertical) Co-Ordinates:

FIGS. 6 & 7 shows method for determining 3-dimensional velocity along geo-physical axes and also method for computing yaw, roll and pitch angles.

Derivation of required information is obtained by using well known Mathematical formulae. Trigonometric relations have been used for computation for explaining this invention. However, as it would normally occur to a person skilled in the art that the problems in issue can be solved by using vector algebraic method, 3-D co-ordinate geometry and matrix algebra as well.

Determination of Horizontal and Vertical Component of $SV_f$ and Pitch Angle.

As shown in FIG. 6, Let $\overrightarrow{OA}$ (15) representing $SV_f$ be inclined to $\overrightarrow{OX}$ (18) the X-coordinate of geophysical plane by $\theta_1°$ (21), where $\theta_1°$ is the pitch angle.

Let $\overrightarrow{OF}$ (48) (=F) be the horizontal component of $\overrightarrow{SV_f}$ along $\overrightarrow{OX}$ (18), F being velocity along $\overrightarrow{OX}$ (18) on Geo-physical plane.

Hence, $F = (\overrightarrow{SV_f}) \cos \theta_1$ (7)

Let, $\overrightarrow{OE}$ (49) (=V) be vertical component of $\overrightarrow{SV_f}$ along $\overrightarrow{OZ}$ (20), V being velocity component along $\overrightarrow{OZ}$ (20) the Z-coordinate of geophysical plane.

Hence, $V = (\overrightarrow{SV_f}) \sin \theta_1$ (8)

Since, sensor Rx Ae along $\overrightarrow{OC}$ (17) of aircraft is also tilted from $\overrightarrow{OZ}$ (20) by $\theta_1°$ (21) (Pitch angle) on the same plane, $\overrightarrow{SV_v}$ is a projection of V' (eqn.-8) and $\overrightarrow{SV_v} = (\overrightarrow{SV_f}) \sin \theta_1 \cos \theta_1$ (9)

As shown in FIG. 7, on bank of angle $\theta_2°$ (50), $\overrightarrow{SV_v}$ becomes a projection of equation (9) on a plane orthogonal to plane AB and in that position $\overrightarrow{SV_v} = (\overrightarrow{SV_f}) \sin \theta_1 \cos \theta_1 \cos \theta_2$ (10)

From equation-10

$$\sin\theta_1 \cos\theta_1 = \frac{\overrightarrow{SV_v}}{\overrightarrow{SV_f} \cos\theta_2} \quad (11)$$

$$\Rightarrow 2\sin\theta_1 \cos\theta_1 = \frac{2\overrightarrow{SV_v}}{\overrightarrow{SV_f} \cos\theta_2}$$

$$\Rightarrow \sin 2\theta_1 = \frac{2\overrightarrow{SV_v}}{\overrightarrow{SV_f} \cos\theta_2}$$

$$\Rightarrow \theta_1 = \frac{1}{2}\sin^{-1}\frac{2\vec{SV_v}}{\vec{SV_f}\cos\theta_2}$$

Determination of Bank Angle.

As shown in FIG. 7, With bank aircraft attains a lateral movement along $\vec{OY}$.

Let, the lateral velocity be L along $\vec{OY}$.

This can be resolved into two components along sensors placed on $\vec{OB}$ (16) and $\vec{OC}$ (17) during bank and L (51) makes an angle $\theta_2$ (50) equal to angle of bank with sensor placed along $\vec{OB}$ (16) such that component $$\text{along } \vec{OB},\ SV_l = L\cos\theta_2 \qquad (12)$$

$$\text{and along } \vec{OC},\ SV_v = L\sin\theta_2 \qquad (13)$$

From equations, (12) and (13), $$\text{Angle of Bank, } \theta_2 = \tan^{-1}\frac{\vec{SV_v}}{\vec{SV_l}} \qquad (14)$$

Speed on Geophysical Plane.

Figure 8:
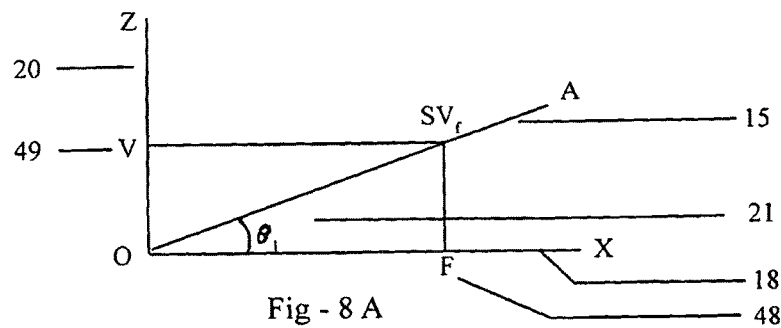
FIG. 8 A Shows method for calculation of horizontal movement vector along dynamic geophysical (OX) axis.
Figure 8:
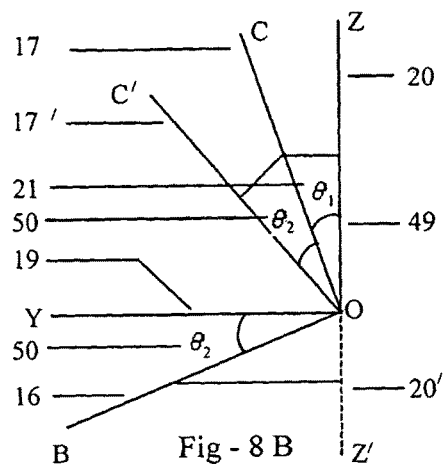
Figure 8:
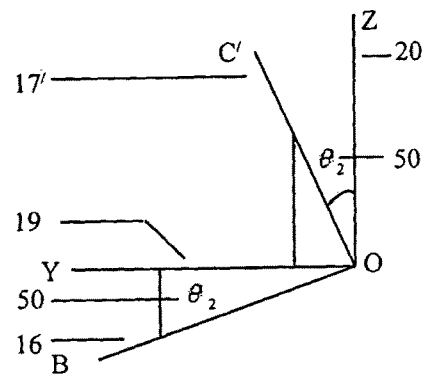
Figure 8:
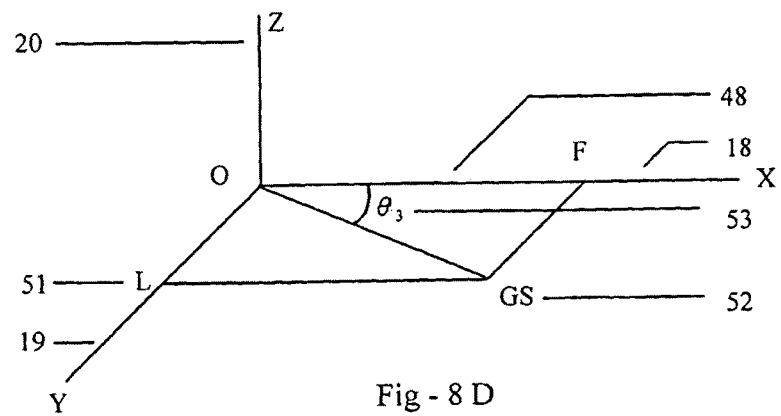

Resolving the spatial velocities along $\vec{OA}(SV_f)$, $\vec{OB}(SV_v)$ and $\vec{OC}(SV_l)$ into components along $\vec{OX}(F)$, $\vec{OY}(L)$, and $\vec{OZ}(V)$ respectively we get, $$F = SV_f \cos\theta_1 \text{(FIG. 8}a\text{)} \qquad (15)$$

$$V = SV_f \sin\theta_1 + (SV_v \cos\theta_1 \cos\theta_2 - SV_l \sin\theta_2)\text{(FIG. 8}b\text{)} \qquad (16)$$

$$L = SV_v \sin\theta_2 + SV_l \cos\theta_2 \text{(FIG. 8}c\text{)} \qquad (17)$$

Accuracy of Velocity Measurement:

$\Sigma\Delta t$=pulse duration (p.d.) of one cycle represents minimum discernible velocity (predetermined) which I have taken to be (for the purpose of explanation) 1 (one) Km/hour. Also for the purpose of explanation whatever calculation has been derived are based on Tx Ae. to Rx Ae. distance $S_0$=3 cm. Use of Time to Digital converter (TDC) of 10 Pico-second resolution, which is commercially available, for time delay measurement enhances the discernibleness. For example, for reference frequency 1 GHz, the cumulated time delay of 1 nano-second represents 1 Km/Hour velocity and 10 p-sec resolution of TDC will enhance measurement accuracy to 0.01 Km/Hour i.e., 2.777777778 millimeter per second. For 10 GHz reference frequency the enhanced accuracy is 0.1 Km/hour 27.77777778 millimeter per second. Availability of TDC of better resolution will further enhance the measurement accuracy.

Determination of Position:

Position displacement 'S' is obtained by multiplying Pulse Repetition Period (PRP) with Average Ground Velocity ($GS_{AV}$) for the duration of PRP. The 'S' value is added to previous position in the craft track direction to obtain current position. The position information is provided in longitude and latitude (based on WGS-84 datum) and by display of craft icon on a moving map wherein movement of moving map is proportional to displacement of the craft. The conversion of bearing and distance information to co-ordinate and vice-versa is obtained by using Vincenty's formula which provides positional accuracy in millimeters.

$$GS_{AV} = \frac{GSp + GSc}{2} \qquad (18)$$

$GS_p$=Ground Velocity at the end of previous PRP $GS_c$=Ground Velocity at the end of current PRP Position Accuracy:

It is proposed to have two sets of sensor for determination of position and correction of integration drift error.

The first set is based on 10 GHz reference frequency. This set is meant for computation of instantaneous 3-D velocity and derivation of instantaneous movement data. Determination of current position will be carried out based on the data of this sensor output. At the end of 11 second period the position will be corrected by using data provided by the second set of sensor. The PRP of the first set sensor will be 125 millisecond and fix rate is 8 per second. Minimum discernible velocity for 10 GHz reference frequency is 0.1 km./hr. Hence minimum discernible displacement per PRP (125 milli-second) is 3.472222222 millimeter. Maximum Error Probability for delay time measurement based on 10 psec resolution of TDC and 100 psec (pulse duration for one cycle) reference is 9 psec per PRP. Based on this assumption error probability for displacement measurement per PRP is 3.125 millimeter. This will result in a maximum drift integration error of 90 meters/hour (0.09 Km/hr i.e., 0.048 NM/hr) in the directions along track and cross track. For the embodiment to be used in aircraft, this itself allows for more than twenty hours of route flying in any airspace conforming to RNP-1 norm i.e., containment in ±1.85 Km (±1 NM) envelope.

Self Correction of Positional Error:

As it is intended to use the embodiment for air vehicle for non-precision approach as well, a second set of sensor is introduced for drift error self correction. The second layer sensor is based on 1 GHz reference frequency and 10 psec TDC resolution. Its PRP is 11 secs and for $\Sigma\Delta t$ measurement error probability of 9 psec per PRP, displacement measurement error is 2.75 cm as against 27.5 cm. drift error for 10 GHz reference frequency over 11 sec operational duration. So position error drift corrected every 11 seconds will reduce error margin by 10 times. The drift error per hour based on 1 GHz reference frequency is 9 mtrs.

A further correction following the below described method will reduce drift error to almost zero (negligible) magnitude.

Fix rate per hour based on 1 GHz reference frequency is 327. When $\Sigma\Delta t$ for every PRP (11 secs) are integrated for 327 PRPs and compared to sum of TDC measured delay over the same time period, the difference gives the time measurement error which converted to displacement error will restrict the drift error to 2.75 cm. The same principle can be practiced for any operational duration and the equipment error for position determination is a maximum of 2.75 cm. at the beginning of a non-precision approach to any runway.

The above mentioned reference frequencies are given as example and will be set, keeping operational requirement of various types of vehicles in view.

Integrity Check:

The gap (quiescent period) between transmission of time frame pulses is enough to process the corresponding received pulse as well as to inject a test pulse of predefined duration and the corresponding received pulse for the test pulse is processed and compared with predefined values at all appropriate levels of processing to check reliability of every sub-system stage. Thus integrity check of the system is ensured prior to every time frame pulse processing. In the event of failure for predetermined number of consecutive time frames appropriate failure indication will be displayed and audio warning will be given.

Primary Flight Data

True Air Speed:

The vector sum of value of Spatial Velocity along longitudinal axis of the aircraft ($SV_f$) and wind vector along longitudinal axis is True Air Speed (TAS) of aircraft in Km/Hour. (Eqn.-29).

Ground Speed:

Ground speed of aircraft is $$G.S. = \sqrt{F^2 + L^2} \text{ Km/Hour (FIG. 8}D\text{)} \quad (19)$$

Aircraft Heading/Ground Heading:

ABLAN can deduce both course and track heading by DR (dead reckoning) from an initial setting. The system can also deduce true and magnetic heading simultaneously. Both the headings are initialized either at start up point or line-up point on the runway. The readings are updated at the end of duration of every time frame pulse and no further help from external source is required after initialization for the rest of the operation period.

For updating of ground heading the following method is followed. Value of $SV_f \sin \theta_1 \cos \theta_1$ is compared to that of $SV_v$ for wings level condition.

If not equal→ground heading and aircraft heading are updated by $\pm\theta_3°$.

(FIG. 8D)

$$\theta_3 = \tan^{-1} \frac{L}{F} \quad (20)$$

If found equal→L value is checked.

If L=0, then no drift. Hence, no change in ground or course heading is required.

Figure 10:
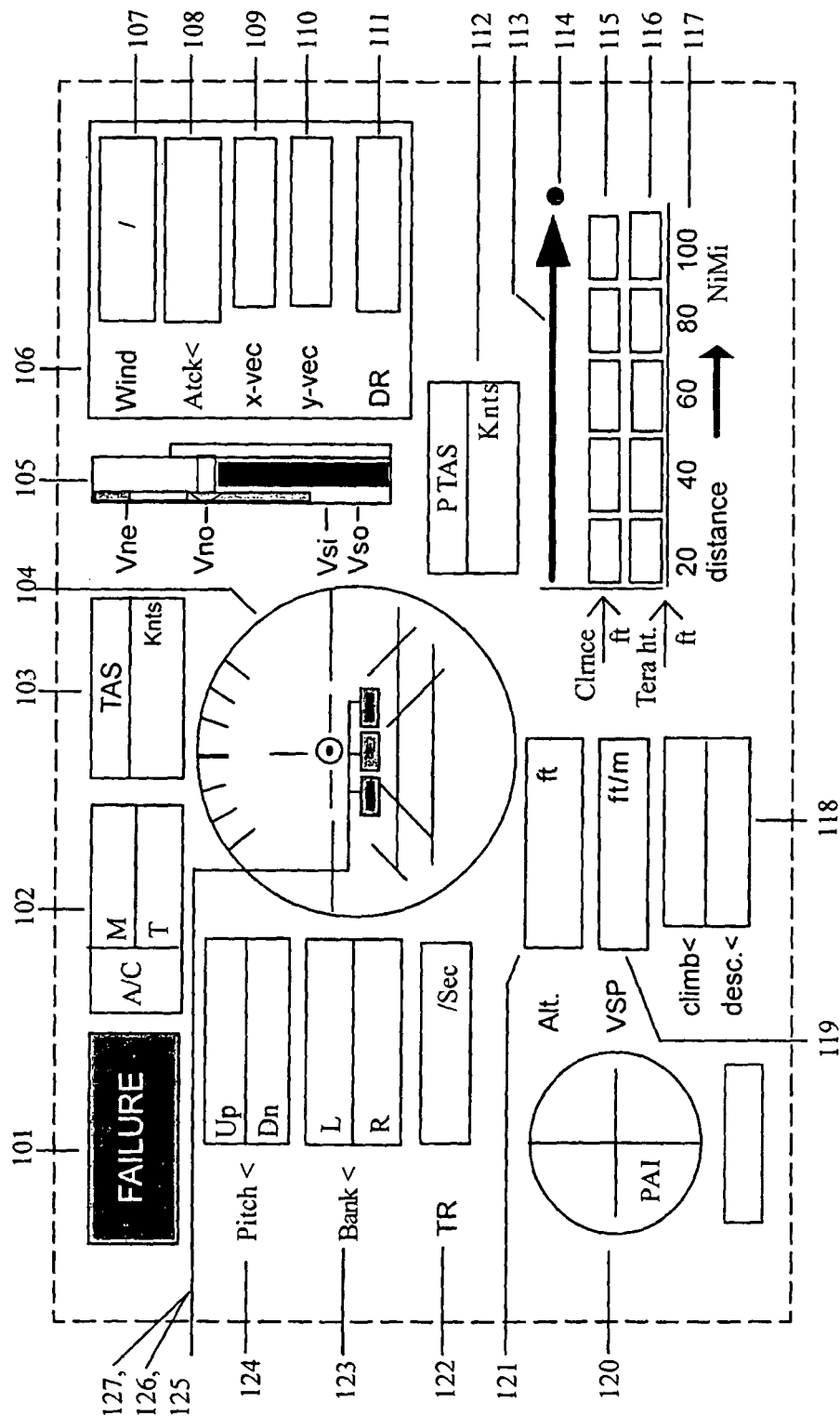
FIG. 10 Shows the Avionics section of display.
Figure 11:
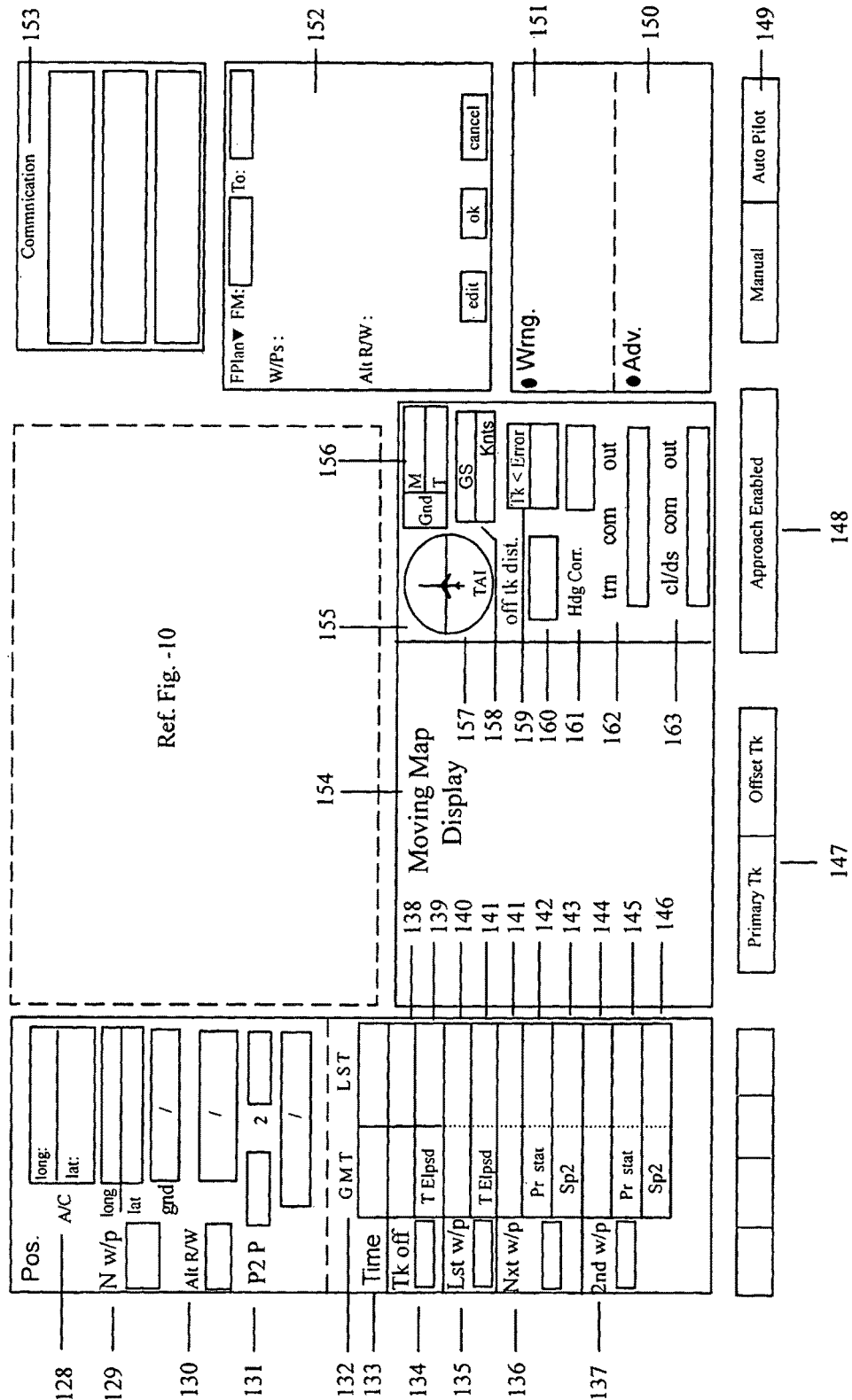
FIG. 11 Shows display of information of all sections except Avionics Section.

If L≠0, then drift is present. Drift warning in the form of flash of light under attitude indicator (125 or 127), displacement of aim figure in track alignment indicator (156) proportional to off track displacement (as in FIG. 10), numerical display of off track distance (159), numerical display of track angle error (158), corrected course (required to steer) (160) (as shown in FIG. 11) are provided. On confirmation of drift condition, ground heading read out is changed by $\pm\theta_3°$ and aircraft heading read out is not changed.

Second counting time period (PRP) onwards $\theta_3$ of previous counting period is compared with $\theta_3$ of current counting period.

If $\theta_3$ (Previous)=$\theta_3$ (current), ground heading is not changed.

If $\theta_3$ (Previous)≠$\theta_3$ (current), ground heading is updated by $\theta_3$ (Previous)~$\theta_3$ (Current).

Altitude:

Initial setting is done at Runway lineup point. Altitude reading is checked and if required corrected and set to runway AMSL (data retrieved from stored data) altitude. Thereafter the reading is updated at the end of duration of every time frame pulse in accordance with vertical displacement per PRP. No external reference is required thereafter during operation duration at any stage.

Rate of Climb/Descent: (Vertical Speed: VSP)

V value (equation-16) is vertical velocity in Km/Hour. Hence, V×54.68066492 gives the rate of climb/descent in feet per minute. Positive value is indicative of climb and negative value is indicative of descent.

Angle of Climb/Descent $$\tan^{-1} \frac{V}{F} \text{ gives the angle of climb and descend} \quad (21)$$

(Pitch Angle)

Equation-(11) gives the pitch angle of the craft.

Bank Angle (Roll Angle)

Equation-(14) gives the bank angle.

Rate of Turn (Yaw Angle)

Eqn.-(20) gives the rate of turn.

Turn Anticipation and Turn Coordination:

Turn alert prior to arriving at the way point predefined for entering into turn is preset and warning is given by visual as well as audio means.

Figure 9B:
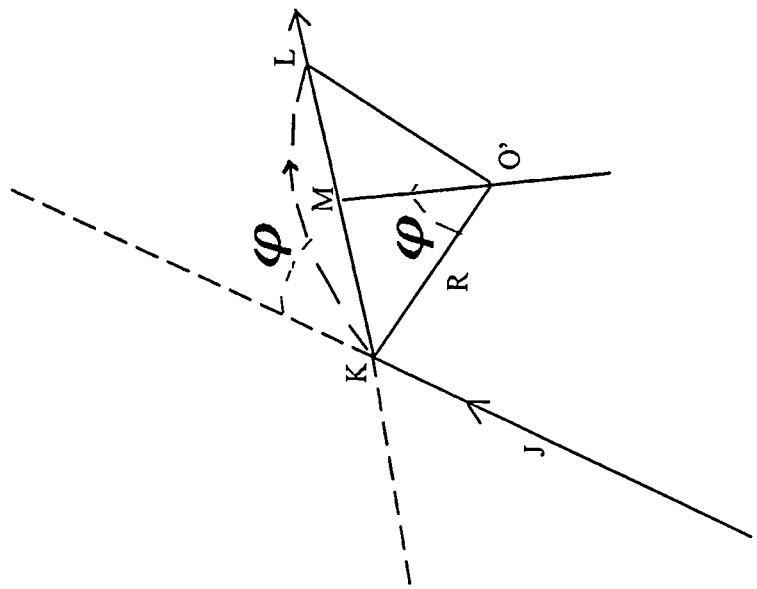
FIG. 9 A Shows method for calculation of turn anticipation and radius (fly by).
Figure 9A:
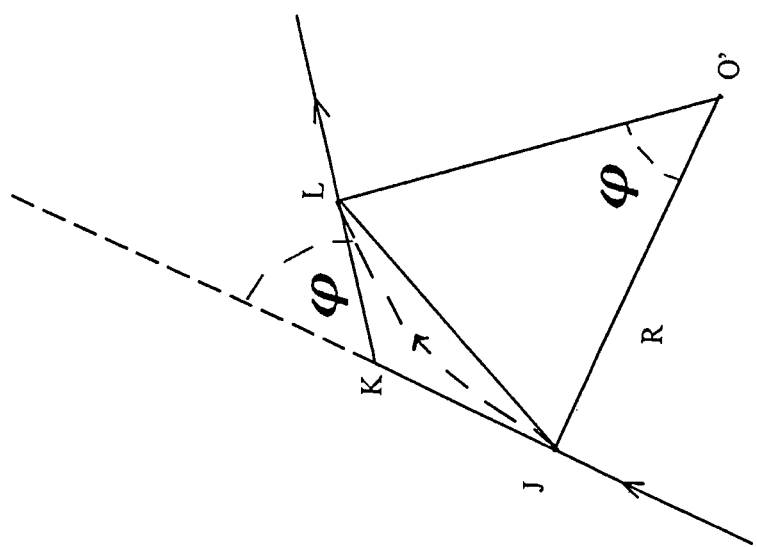

For 'fly by' turn (FIG. 9A), the predefined way point to enter turn is point (J) on current track, selected ahead of the intersection point (K) of present segment with segment to follow. For 'flyover' turn (FIG. 9B), the predefined point is the point of intersection (K) itself. To follow the centre line of the track during turn, a turn radius is determined (if already not notified by ATS route designator). The coordinate of the origin (O') of radius is determined. The turn radius (R) to the said origin is maintained during the period of turn.

Location of Origin of Turn Radius:

For fly by, the origin (O') is a point located in a direction of 90° to the track heading and in the inner side of the turn and is at a distance R from the entry way point (J) where, $$R = \text{Arm} \div \tan\left(\frac{\varphi}{2}\right) \quad (22)$$

And arm length is the distance between the point to enter turn (J) and the point of intersection (K) of two segments and $\varphi$ is the angle difference between present track (JK) and track of the following segment (KL).

For fly over, the origin (O') is a point orthogonal to the current track (JK) and is at a distance R from the point of intersection (K), $$\text{And } R = KM \sin \varphi \quad (23)$$

Arm length (KL) is the distance between the point of intersection and a point (L) selected on the track (KL) of the following segment point 'IA' being mid-point of KL.

The Arm length and turn radius (R) will depend on the type of aircraft.

Wind Vector:

To determine Wind direction, speed and components of wind vector along longitudinal, lateral and vertical axes the computation procedure is as follows.

Craft moving through air will be subjected to two types forces; self generated thrust and wind vector. Along each body fixed axes, these forces will cause spatial velocity for the craft.

Let the velocity components due to self generated thrust be $V_C$ i.e. $V_{TAS}$ along longitudinal axes, $V_l$ along lateral axis and $V_v$ along vertical axis.

Similarly the wind vector will have spatial velocity components along each of the body fixed axis of the craft. Let $V_W$ is the wind vector in the vicinity of the air vehicle. $V_{WH}$ is component of $V_W$ on plane AB (horizontal plane) and $V_{WV}$ is component of $V_W$ on plane BC (vertical plane). β & γ are the angles made by spatial velocity components of $V_W$ with plane AB and plane BC respectively.

So, $V_{WH} = V_W \cos β$

And $V_{WV} = V_W \cos γ$

FIG. 4B.

$V_{WH}$ makes an angle τ with OA (longitudinal axis). $V_{WH}$ is resolved into two components. One component is along longitudinal axis. Its value is $V_{WH} \cos τ$. The other is along lateral axis of the air vehicle. Its value is $V_{WH} \sin τ$.

The sensor receiver along OA gives out put $SV_f$. It is vector sum of True Airspeed $V_{TAS}$ and component of $V_{WH}$ along longitudinal axis.

$$SV_f = V_{TAS} + V_{WH} \cos τ \quad (24)$$

The sensor receiver along OB gives out put $SV_l$. It is vector sum of $V_l$ and $V_{WH} \sin τ$.

$$SV_l = V_l + V_{WH} \sin τ \quad (25)$$

Similarly along OC, $$SV_v = V_v + V_{WV} \cos σ \quad (26)$$

As shown in FIG. 4B two sensor Rx Aes (27, 28), each placed at α° (clockwise) to $SV_f$ and $SV_l$ sensor Rx Aes (23, 24) respectively help compute wind vector components along longitudinal axis and lateral axis respectively. Let the outputs of these two sensors be $S_1$ and $S_2$ respectively and they are in the same unit of measurement as that spatial velocity of the craft.

The computations are done using the following equations.
Wind Vector Components:

For wind speed of $V_{WH}$ Kms/Hour blowing towards a direction at τ° (clockwise) to aircraft heading, component along longitudinal axis, $$V_{WH} \cos τ = (S_1 \cos α - S_2 \sin α) - SV_f \cos 2α \quad (27)$$

And component along lateral axis, $$V_{WH} \sin τ = (S_1 \sin α + S_2 \cos α) - (SV_l + SV_f \sin 2α) \quad (28)$$

$$V_{TAS} = SV_f - V_{WH} \cos τ \quad (29)$$

Drift:
Eqn.-17 gives drift rate.
Wind Speed on Horizontal Plane $$(V_{WH}) = \sqrt{(V_{WH} \cos τ)^2 + (V_{WH} \sin τ)^2} \quad (30)$$

$$τ = \tan^{-1} \frac{V_{WH} \cos τ}{V_{WH} \sin τ} \quad (31)$$

Direction of wind (Wind from direction)=(Aircraft heading w.r.t. true north+τ)+180° (32)

If value exceeds 360°, then 360° is subtracted from the sum.
Course Correction for Drift Elimination:

Let, 'a' be the present heading of the craft and 'w' the wind towards direction. Then course correction required for maintaining the desired track is $$\text{Course correction Angle: } Δa = \sin^{-1} \frac{V_{WH} \sin(w - a)}{V_{TAS}} \quad (33)$$

$$\text{Course to steer: } c = w - (a + Δa) \quad (34)$$

Similarly, other two additional receivers $S_3$ & $S_4$ with antennae aligned on vertical plane at an angle of α with respect to receiver antennae (28, 29) will help compute wind vector component on vertical plane and along OC. Component along OC, $$V_{WV} \cos σ = (S_3 \cos α - S_4 \sin α) - SV_v \cos 2α \quad (36)$$

and orthogonal to it on the game plane, $$V_{WV} \sin σ = (S_3 \sin α + S_4 \cos α) - (SV_l + SV_v \sin 2α) \quad (37)$$

$$V_{WV} = \sqrt{(V_{WV} \cos σ)^2 + (V_{WV} \sin σ)^2} \quad (38)$$

$$σ = \tan^{-1} \frac{V_{WV} \cos σ}{V_{WV} \sin σ} \quad (39)$$

However, keeping economy, space and operational requirement in view the receivers $S_3$ & $S_4$ may not be used. For zero pitch angle and wings level condition $SV_v$ gives the wind component along OC and path angle correction for maintaining predefined height can be calculated from computed angle of climb and descent (eqn.-21). These extra sensors are required for air, marine, sub-marine vehicles i.e. vehicles, moving through fluid medium and not for other types of vehicles.

Angle of Attack:
Angle of Attack is difference of Pitch Angle (Eqn.-11) and Angle of Climb/Descent (Eqn.-21).
Track Angle Error (TAE):
It is the difference between desired track and actual track. Hence, it is the angle between bearing to next way point from current craft position and present track heading.
Off Track Distance:
Direct Segment:
Angle between azimuth from next way point to current craft position and reverse direction of route segment is determined. Distance from current craft position to next way point is determined. Let, the angle be δ and distance h. So, the perpendicular distance to the desired track i.e., $$\text{Off Track Distance is } p = h \sin δ \quad (40)$$

During Turn:
Difference between Turn radius (eqns.-22 and 23) and actual distance to origin of the turn computed from craft position coordinate and coordinate of origin of turn radius gives the Off Track Distance during turn.
Display
1. Avionics (FIG. 11)—

The conventional panel instruments are substituted by graphical display. The names are only suggestive of corresponding conventional panel instrument function.

Failure Indication (101):
Gives out light flash to indicate a failure condition. Details of failure are enumerated under warning details (146)
Heading Indicator (102):
Aircraft true and magnetic heading are numerically displayed in the marked boxes.
Airspeed Indicator (103, 105 & 112):
TAS is numerically displayed (103). To the right of Attitude indicator (104) the True Airspeed (TAS) Bar (105)

is displayed. A vertical Bar with a horizontal arrow on its head moves on the scale on which vital speeds for various status of flight such as stall, max endurance, maximum distance, normal and maximum limit speeds are marked. To the right of and attached to the TAS bar is a slender vertical bar that indicates the prospective TAS in next five seconds and the prospective TAS (112) is displayed numerically below the TAS bar (105).

Attitude Indicator (104):

It is located at centre of Avionics Section. The aircraft icon is at the centre of it. The graphical look is same as conventional Attitude Indicator. Level of horizon is indicated by two straight lines each in line with either of the wings of the icon. The attitude of the aircraft is indicated by position of the aircraft icon for bank, climb and descent with respect to horizon.

Wind Vector (106):

Instantaneous relative Wind direction and speed (107), Angle of Attack (108), wind vector components along longitudinal axis (109) and along lateral axis (110) as well as drift rate (111) are numerically displayed.

Turn Indicator (122):

Turn rate in degrees/second is displayed numerically.

Bank Angle (123):

Accurate bank angle to left or right is displayed.

Turn Coordinator:

Three lights are placed below the attitude indicator to indicate whether path on the turn segment is actually followed or not. The centre light (126) gives on path indication. If deviating to inside of the turn then the light to turn side (125/127) comes on and when deviating outwards (opposite) to turn side the light opposite to turn side (125/127) comes on; the later being a sure indication for skid condition.

Vertical Information:

All information related to vertical movement and position are displayed below the Attitude Indicator (104). Angle of climb/descent (118), Vertical Speed (119), Altitude (121), terrain obstruction height on track heading (116), Clearance height over obstruction (115), vertical inclination indicator (113, 114) to indicate whether the craft is moving with zero climb/descent angle or positive or negative angle indicated by the position of the arrow with respect to the point. In the path alignment indicator (120) an icon moves in proportion to vertical height offset from predetermined height planned and by moving controls to bring the icon to cross ensures correct vertical path position for the craft.

2. Navigation Information: (FIG. 11)

Position Information:

Position of aircraft (128) in longitude and latitude, position of next way point (129) in longitude and latitude and in terms of bearing and distance from aircraft present position, position of alternate runway (130) (airfield) for the current route segment in bearing and distance from aircraft current position. Also, the current position is displayed in moving map display section (154)

Time Information (133):

Time related to take off airfield (134), last way point (135), next way point (136), $2^{nd}$ way point (137) are displayed numerically. The times to be displayed are take off time (138), time elapsed since take off (139), time over last way point (140), time elapsed since crossing last w/p (141), ETA over next w/p as per flight plan (142), present estimate of time over next w/p (143), speed adjustment required to meet ETA (planned) at next w/p (144), similar information for $2^{nd}$ next w/p (145, 146 & 147).

3. Control Guidance: (FIG. 11)

Horizontal Control Guidance (157):

The control guidance information is meant to provide guidance to the crew for maintaining a predetermined track. The information provided are direction of ground track (true and magnetic) (155), ground speed (157), Track Alignment Indicator TAI (159) which has an icon to indicate horizontal displacement from track and the crew of the craft can take the icon as aim figure to be kept on the cross to be on the centre line of the track, Track Angle Error TAE (161), off track distance (162), heading correction/course to steer for maintaining track) (163). The information windows (164) and (165) are also meant for control guidance to the crew, hence placed under this group.

Turn Anticipation, Commence and Level Off Indicator (164):

trn flashing is meant to indicate aircraft is approaching way point to enter turn, com flashing indicates to commence turn and out flashing indicates to level off. The box is meant to provide turn direction (left/right) and roll out heading numerically.

Climb/Descent Anticipation, Commence and Level Out Indicator (165):

Either of 'cl' or 'ds' of cl/ds flashes to alert approach of w/p to commence climb or descent, com flashing indicates to commence climb or descent, and out flashes to indicate to complete manoeuvre. The box is meant to provide level out altitude. Path Alignment Indicator PAI (120) in FIG. 10, is also a control guidance facility for maintaining predetermined altitude by keeping the aim figure at the cross.

4. Additional Information and Aid:

Communication (155):

Route (main and stand by) communication frequency and ATC communication frequency and station identity are displayed.

Flight Plan, Check List & Other Reference Information (152):

Complete Flight Plan with 'From-To', way points, alternate runways information are displayed. The next w/p is highlighted. So is the alternate runway for the current route segment in which the craft is flying. It facilitates pre flight loading of flight plan as well as editing flight plan during flight without disturbing the normal operation. The crew can select 'check list' and desired checklist as selected from a sub-menu will be displayed in the same window, other reference information will be available on the same window upon selection.

Warning (151):

As and when a failure or otherwise warning condition arise the flashing light draws attention of the crew and brief detail of warning is displayed.

(i) Drift (ii) Collision (iii) Weather (iv) Any warning from ATS (v) Equipment failure etc. are conditions for warning.

Advice (150):

Advice received from Air Traffic Management (ATM) agency through data link as well as those self generated are displayed here.

Figure 12:
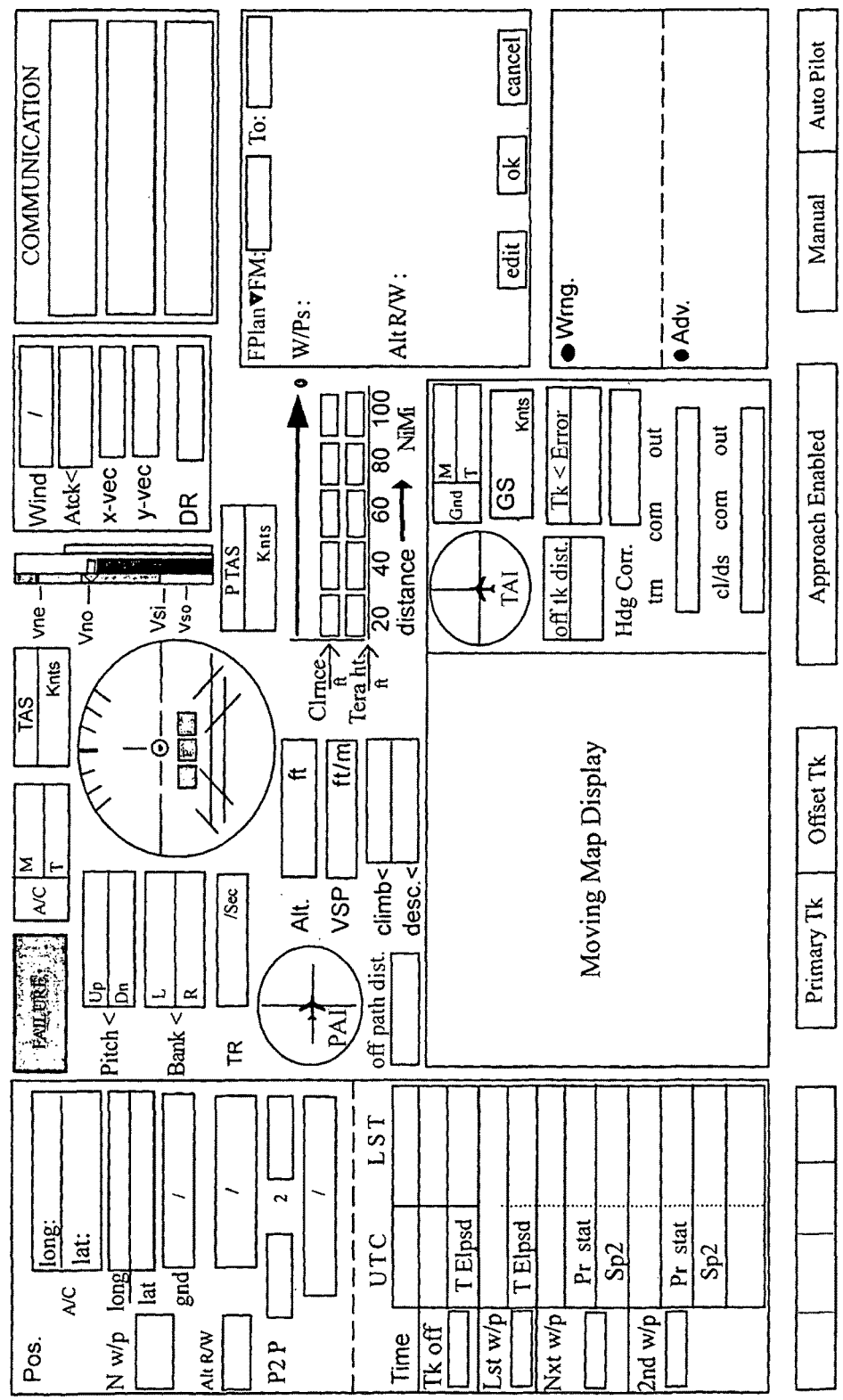
FIG. 12 Depicts the single screen display of primary flight data, navigation and control guidance and other information.

5. Navigation from Start to Destination:

Navigation and control guidance during Taxi out, Line up and departure (SID), Route and STAR (standard arrival) segments are facilitated by display of aircraft icon at the centre of appropriate map displayed (154) depicting current aircraft position and movement of map/chart in proportion to aircraft displacement and through graphical display of information as given under 'control guidance', position and time section. FIG. 12 depicts display of Avionics, Navigation, Control and Additional Information on a single screen.

Non Precision Approach:

Landing Guidance:

ABLAN System provides two types of non-precision landing guidance simultaneously.

(i) Screen displayed guidance (ii) Interactive Voice Response (IVR) system audio guidance.

Each is self sufficient to provide non-precision landing support of category I, II and III and is independent of the other. ABLAN System can cater for any temporary change in TDP position and usable length of the runway in use which can be set manually after receiving ATC advice or NOTAM.

Screen Displayed Guidance:

The normal subject centric moving map display (154) continues. An extended centre line starting from R/W touchdown point coordinate with arrow head at TDP is displayed on moving map display (154) for reference as track to be aligned with.

The approach and landing aid window opens to the right of the Moving Map Navigation window (154) in the horizontal control guidance window (157) with Runway heading up map display.

FIG. 13A.

It has display of (a) R/W icon (56) with marked touchdown point (58), (b) runway area landmarks and obstructions—and (c) an extended centre line (63) starting from R/W touchdown point.

Track Guidance:

All that the pilot has to do is to follow the extended center line (63) as track by aligning aircraft icon (64) with it. The Approach fixes, initial (62), intermediate (61), final (60) and missed approach point (59) are marked on the extended centre line.

Figure 13:
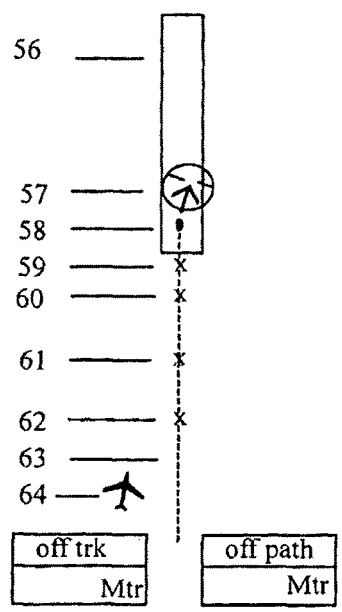
FIG. 13 A Shows method for computation of visual display for LNAV during approach.
Figure 13:
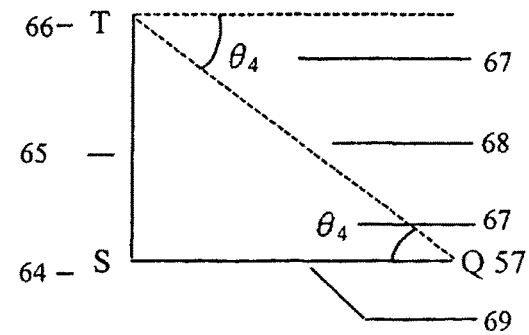

Path Guidance:

FIG. 13A shows the icon ⎯↑⎯ (57) generated at the point where the aircraft will touch the ground if present glide angle and rate of descent is maintained. The pilot has to adjust rate of descent so that the blank of the icon ⎯↑⎯ (57) aligns with the TDP marker (58) on track to give this view.

Position of craft on path is determined by following method. As shown in FIG. 13B T (66) is the present spatial position of the aircraft. The corresponding ground position is S (64). ST (65) is the altitude above R/W altitude (AMSL). TQ (68) is the present path on current track heading, Q being the projected TDP (⎯↑⎯) (57).

$$\tan\theta_4 = \frac{ST}{SQ}(\theta_4(67) = \text{angle of descent}) \Rightarrow SQ = \frac{ST}{\tan\theta_4} \quad (41)$$

Thus, position of Q is marked on the landing R/W map and at point Q projected aim figure icon for path guidance (⎯↑⎯) (57) is displayed.

Audio Guidance

Track Guidance:

An Interactive Voice Response (IVR) system simulates ground radar controller. The following is the method for track guidance. Bearing of the TDP (58) from current position of the craft (64) is compared with runway direction.

Found equal: voice on track.

Found not equal: Bearing of TDP is compared with (Runway heading+180)

Found in the domain [R/W direction & (R/W+180) direction]

Voice—Left of track.

Found not in the domain [R/W direction & (R/W+180) direction]

Voice—Right of track.

Figure 14A:
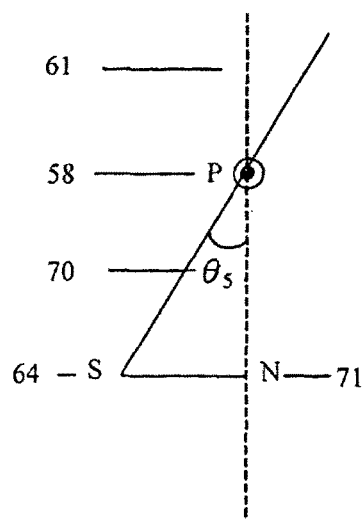
FIG. 14 A Shows method for computing audio guidance for LNAV during approach.
Figure 14:
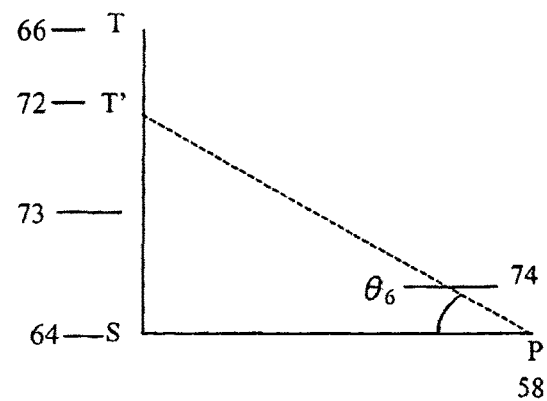

FIG. 14 A illustrates method for determining actual off track distance.

S (64) is the momentary aircraft ground position. P (58) is the TDP. SP is the ground distance to TDP. SN is the normal to PN (R/W extended centre line)<SPN=$\theta_5$ (70) and $$SN = SP \sin\theta_5 \text{ in meters} \quad (42)$$

$$PN = SP \cos\theta_5 \quad (43)$$

Voice announces the individual digits of the measured distance (SN). Sequence of voice guidance for track—ON/Left oft/Right of—Track, XYZ Meters.

When PN value approaches Missed Approach Point Distance from TDP, IVR warns the crew.

Path Guidance:

FIG. 14 B illustrates method for path guidance. T (66) is the spatial momentary position of the aircraft. S (64) is the corresponding position on ground. P (58) is the TDP.

ST is ht. of aircraft over ground found from the difference of aircraft altitude (AMSL) and R/W altitude (AMSL)

SP is the ground distance to TDP. ST' (73) is the desired ht. for desired glide angle $\theta_6$ (74):

$$ST' = SP\tan\theta_6 \quad (43)$$

When, $ST - ST' = 0$    voice-on path.

$\neq 0$ and $(+)ve$    voice-high on path $\neq 0$ and $(-)ve$    voice-low on path.

|ST−ST'|→ht difference in meters.

Guidance sequence: high/low/on path. XYZ meters.

As craft approaches ST'=decision height, voice advices: Decision.

Abort (Missed Approach)

A Missed Approach is followed by increase in altitude and speed. This is interpreted by the system and moving map display is changed to Area Map, control guidance window is restored and missed approach procedure is followed.

Holding Pattern

A point is selected in coordinates. A holding pattern figure is generated and displayed on the moving map for guidance of the crew.

Taxiing in

As the aircraft completes 100 meters run on the runway after TDP both Navigation and Landing windows disappears from the screen and airfield map appears on the screen facilitating taxiing back to parking area.

Integration with AFCS (Auto Pilot):

Data and command generated will be fed to AFCS for control of aircraft.

Integration with Communication Capable of Digitalized Data Transfer:

Integration with ATN or any other suitable means for digitalized data exchange will facilitate (i) exchange of position and movement data between aircraft directly or through ground agency for ACAS type I and II service, (ii) Cockpit Display of Target Information (CDTI) function to provide crew the current traffic environment, (iii) Automatic Dependence Surveillance (ADS) service to provide Air Traffic Management (ATM) and aircraft fleet owner the position and movement information in respect of the aircraft.

Fail Operational System:

By operating two numbers of the system of present invention in tandem, a fail operational configuration will be achieved.

CONCLUSION

Though the embodiment for use in aircraft has been described, the use is not exclusive and does not exclude uses other than which have been described. The sensor sub-system can be used in remaining types of vehicles (surface, sub-surface, marine, sub-marine and space) for determining movement vector of the fluid (air and/or water) medium through which the mount vehicle moves and 3-Dimensional spatial velocity of the mount vehicle and as such related movement, orientation, position data can be computed and start to destination navigation, control and guidance aid for vehicles operating on surface of the earth, in tunnels, on water surface, below water surface and space will be provided by the system as would be appreciated by the ones skilled in the art.

I claim:

1. A stand alone on board navigation aid apparatus alternate to and not involving global positioning system (GPS), inertial measurements unit (IMU), gyroscopic instruments and pressure instruments based navigation aid systems for a vehicle adapted to move in fluid medium comprising:
    a sensor sub-system to measure data dictated by arrangement of sensors positioned in the said sensor sub-system; and
    an element electrically connected to the sensor sub-system and configured to determine navigation aid sensor data for the vehicle, navigation-aid data for the vehicle, and fluid movement data in the vicinity of the vehicle using data measured by the sensor sub-system;
    wherein the sensor sub system includes:
        i. sensors formed by pairing a transmitter and receivers and comprise of:
        a transmitter configured to transmit pulses wherein the pulses do not carry any electronic information and are of pre-determined duration; and
        three sets of receivers comprising:
        a first set of receivers comprising three receivers of which each positioned at right angles to one another and each on a straight line originating from the transmitter and the straight line is parallel to one of the body fixed principal axes of the vehicle wherein each receiver is placed at a distance of few centimeters from the transmitter and each capable of receiving the pulses transmitted by the transmitter;
        a second set of receivers comprising two receivers of which each positioned at right angles to one another and each on a straight line originating from the transmitter and the straight line is at an angle to one of longitudinal axis and lateral axis of the vehicle wherein each of the receivers is placed at a distance of few centimeters from the transmitter and each capable of receiving the pulses transmitted by the transmitter; and
        a third set of receiver comprising two receivers of which each positioned at right angles to one another and each on a straight line originating from the transmitter and the straight line is at an angle to one of longitudinal axis and vertical axis of the vehicle wherein each of the receivers is placed at a distance of few centimeters from the transmitter and each capable of receiving the pulses transmitted by the transmitter;
        ii. a first element electronically connected to the transmitter and to each receiver of the three sets of receivers, and configured to measure propagation time for direct and not reflected propagation of pulses from the transmitter to each of the receivers of the three sets of receivers;
        iii. a second element communicatively coupled to the first element and configured to measure change in propagation time affected by movement of the vehicle and further configured to convert the said change in propagation time into spatial velocity of the vehicle along the directions of each of the receivers of all the three sets of receivers using data of the first element.

2. The apparatus as in claim 1, wherein the fluid is at least one of air and water.

3. The apparatus as in claim 1, wherein the vehicle is one of air, marine and submarine vehicle.

4. The apparatus as in claim 3, wherein the vehicle is an air vehicle.

5. The apparatus as in claim 1, wherein the pulse is one of laser, infrared and radio wave pulse.

6. The apparatus as in claim 1, the transmitter is a radio wave transmitter and the receivers of the three sets of receivers are radio wave receivers.

7. The apparatus as in claim 1,
    wherein the element:
    computes at least one of navigation aid sensor data, in respect of the air vehicle, conventionally computed by at least one of primary flight instruments and overcomes known operational short comings inherent to the said primary flight instruments;
    computes at least one of navigation aid data, in respect of the air vehicle, conventionally computed by at least one of GPS, inertial sensor, and pressure instrument based navigation aid system and overcomes well known short comings inherent to the said instruments;
    computes air movement data comprising speed and direction of movement of air in the vicinity of the air vehicle moving in air medium;
    compute effect of air movement on movement of the air vehicle;
    computes correction of heading required for the air vehicle to remain on a pre-determined course;
    generates audio guidance for crew of the air vehicle;
    generates graphic for displaying thus computed navigation aid data for aiding crew of the vehicle to navigate the vehicle from start to destination; and
    is electrically connected to a display unit.

8. The apparatus of claim 7, wherein audio guidance for crew in respect of the air vehicles includes audio guidance for the crew during approach to runway for landing.

9. The apparatus as in claim 7, the display unit displays the graphic and the computed navigation aid sensor data, the navigation aid data, and the air movement data on the graphic for aiding self contained navigation of the vehicle by the crew.

10. A method, alternate to conventional methods based on global positioning system (GPS), inertial measurements unit (IMU), pressure instruments, for determining navigation aid sensor data, navigation aid data and fluid movement data for a vehicle adapted to move in a fluid medium and for overcoming shortcomings inherent to the said conventional methods comprising:

measurement of data dictated by arrangement of sensors in a sensor sub system placed on board the vehicle;

measurement of navigation aid sensor data, navigation-aid data, and fluid movement data required for self contained end to end navigation of the vehicle by an element also placed on board the vehicle and configured to compute said navigation aid sensor data, navigation-aid data and fluid movement data using data obtained from the sensor sub system;

wherein the sensor sub system includes:

i. sensors formed by pairing a transmitter and receivers and comprise of:

a transmitter configured to transmit pulses wherein the pulses do not carry any electronic information and are of pre-determined duration; and three sets of receivers comprising:

a first set of receivers comprising three receivers of which each positioned at right angles to one another and each on a straight line originating from the transmitter and the straight line is parallel to one of the body fixed principal axes of the vehicle wherein each receiver is placed at a distance of few centimeters from the transmitter and each capable of receiving the pulses transmitted by the transmitter;

a second set of receivers comprising two receivers of which each positioned at right angles to one another and each on a straight line originating from the transmitter and the straight line is at an angle to one of longitudinal axis and lateral axis of the vehicle wherein each of the receivers is placed at a distance of few centimeters from the transmitter and each capable of receiving the pulses transmitted by the transmitter; and a third set of receiver comprising two receivers of which each positioned at right angles to one another and each on a straight line originating from the transmitter and the straight line is parallel to one of longitudinal axis and vertical axis of the vehicle wherein each of the receivers is placed at a distance of few centimeters from the transmitter and each capable of receiving the pulses transmitted by the transmitter;

ii. a first element electronically connected to the transmitter and to each receiver of the three sets of receivers, and configured to measure propagation time of the pulses for direct and not reflected propagation from the transmitter to each of the receivers of the three sets of receivers;

iii. a second element communicatively coupled to the first element and configured to measure change in propagation time affected by movement of the vehicle and further configured to convert the said change in propagation time into spatial velocity of the vehicle along the directions of each of the receivers of all the three sets of receivers using data of the first element.

11. The method as in claim 10, wherein the fluid is at least one of air and water.

12. The method as in claim 10, wherein the vehicle is one of air, marine and submarine vehicle.

13. The method as in claim 12, wherein the vehicle is an air vehicle.

14. The method as in claim 10, wherein the pulse is one of laser, infrared and radio wave pulse.

15. The method as in claim 10, the transmitter is a radio wave transmitter and the receivers of the three sets of receivers are radio wave receivers.

16. The method as in claim 10, the element is configured to compute at least one of navigation aid sensor data, in respect of the air vehicle, conventionally computed by at least one of primary flight instruments and overcomes inherent operational short comings of the said primary flight instruments.

17. The method as in claim 10, the element is configured to compute at least one of navigation aid data, in respect of the air vehicle, conventionally computed by at least one of GPS, inertial sensor, and pressure instrument based navigation aid systems and overcomes inherent short comings of the said instruments.

18. The method as in 10, wherein the computed fluid movement data in the vicinity of the vehicle includes i) speed ii) direction and iii) angle of attack.

\* \* \* \* \*